US008614663B2

(12) United States Patent
Kruglick

(10) Patent No.: US 8,614,663 B2
(45) Date of Patent: Dec. 24, 2013

(54) SELECTIVE MOTOR CONTROL CLASSIFICATION

(75) Inventor: Ezekiel Kruglick, Poway, CA (US)

(73) Assignee: Empire Technology Development, LLC, Wilmington, DE (US)

( * ) Notice: Subject to any disclaimer, the term of this patent is extended or adjusted under 35 U.S.C. 154(b) by 694 days.

(21) Appl. No.: 12/724,023

(22) Filed: Mar. 15, 2010

(65) Prior Publication Data

US 2011/0221770 A1 Sep. 15, 2011

(51) Int. Cl.
  *G09G 3/34* (2006.01)
  *G09G 5/00* (2006.01)
(52) U.S. Cl.
  USPC .......................... 345/156; 345/158; 345/163
(58) Field of Classification Search
  USPC .................. 345/633, 156–158, 173, 175;
         463/30–34; 382/107, 106, 103;
         178/18.01–18.09, 18.11, 19.01–19.07;
         715/865
  See application file for complete search history.

(56) References Cited

U.S. PATENT DOCUMENTS

| 5,952,805 | A   | * | 9/1999  | Heaton         | 318/561 |
| 6,144,366 | A   | * | 11/2000 | Numazaki et al.| 345/156 |
| 8,050,780 | B2  | * | 11/2011 | Tessier et al. | 700/63  |
| 2006/0033713 | A1 | * | 2/2006 | Pryor          | 345/158 |
| 2007/0057924 | A1 | * | 3/2007 | Prados et al.  | 345/173 |
| 2007/0060391 | A1 | * | 3/2007 | Ikeda et al.   | 463/46  |
| 2009/0015559 | A1 |   | 1/2009 | Day et al.     |         |
| 2009/0268945 | A1 | * | 10/2009| Wilson et al.  | 382/103 |

OTHER PUBLICATIONS

International Search Report and Written Opinion in PCT/US2011/023850, issued on Sep. 2, 2011.
Cikajlo, Imre, "Integration of virtual reality based task into controlled dynamometry to enhance motor rehabilitation," Virtual Rehabilitation, 2008, pp. 157-162, IEEE Xplore, University of San Diego, CA, USA.
Moore, et al., "A galvanic skin response interface for people with severe motor disabilities," Proceedings of the 6th international ACM SIGACCESS conference on Computers and accessibility, 2004, pp. 48-54, http://portal.acm.org/citation.cfm?doid=1028630.1028640, Atlanta, GA, USA.
Piekarski, et al., "Mobile Hand Tracking Using FPGAs for Low Powered Augmented Reality," in Wearable Computers, IEEE International Symposium, 2004, pp. 190-191, vol. 0, IEEE Computer Society, Los Alamitos, CA, USA.
Piekarski, et al., "Integrated head and hand tracking for indoor and outdoor augmented reality," 2004, pp. 11-276, IEEE Virtual Reality Conference, Chicago, IL, USA.

(Continued)

*Primary Examiner* — Kenneth Bukowski
(74) *Attorney, Agent, or Firm* — Moritt Hock & Hamroff LLP; Steven S. Rubin, Esq.

(57) ABSTRACT

Techniques for detecting and classifying motion of a human subject are generally described. More particularly, techniques are described for detecting and classifying motion as either a broad selection or a precise selection to facilitate interaction with augmented reality (AR) systems. An example may include detecting a motion of human and repeatedly analyzing a step response associated with the motion to determine one or more of a peak time $t_p$, an estimated overshoot magnitude $M_p$, a damping ratio $\zeta$ of the step response and/or one or more polynomial poles of the step response. Such information may be useful in classifying the motion as either a precise selection or as a broad selection.

22 Claims, 7 Drawing Sheets

(56) References Cited

OTHER PUBLICATIONS

Bryanton, et al., "Feasibility, Motivation, and Selective Motor Control: Virtual Reality Compared to Conventional Home Exercise in Children with Cerebral Palsy," 2006, pp. 123-128, No. 2, CyberPsychology Behavior 9, Ottawa, Ontario, Canada.

Jong, R.D., et al., "Strategies and Mechanisms in Nonselective and Selective Inhibitory Motor Control," Journal of Experimental Psychology, Human Perception and Performance, Jun. 1995, pp. 498-511, vol. 21, No. 3, American Psychological Association, Inc., USA.

Seymour, N. E., et al., "Virtual Reality Training Improves Operating Room Performance: Results of a Randomized, Double-Blinded Study," Annals of Surgery, Oct. 2002, pp. 458-464, vol. 236, Issue 4, Lippincott Williams & Wilkins, Inc., Philadelphia, PA, USA.

Piekarski, W. and Thomas, B. H., "Tinmith-Metro: New Outdoor Techniques for Creating City Models with an Augmented Reality Wearable Computer," In ISWC2001, 5th International Symposium on Wearable, Oct. 8-9, 2001, pp. 1-8, IEEE, Zurich, Switzerland.

Slay, H., et al., "Tangible User Interaction Using Augmented Reality," In Proceedings of the Third Australasian User interfaces Conference 2002, Australia, 2001, pp. 13-20. vol. 7, Issue 4, Australian Computer Society, Melbourne, Australia. [Month of publication is unknown. The year of publication is sufficiently earlier than the effective U.S. filing date and any foreign priority date so the particular month of publication is not in issue.].

Slay, H., et al., "Interaction Modes for Augmented Reality Visualization," in Proceedings of the 2001 Asia-Pacific Symposium on Information Visualisation, Australia, Dec. 2001, pp. 71-75, vol. 9, Australian Computer Society, Inc., Melbourne, Australia.

Paus, T., "Primate Anterior Cingulate Cortex: Where Motor Control, Drive and Cognition Interface," Nature Reviews, Neuroscience, Jun. 2001, pp. 417-424, vol. 2, Macmillan Magazines Ltd., United Kingdom.

Dvorkin, A.Y., et al., "Reaching within Video-Capture Virtual Reality: Using Virtual Reality as a Motor Control Paradigm," Cyberpsychology and Behavior, Apr. 2006, pp. 133-136, vol. 9, Issue 2, Mary Ann Liebert, Inc., New Rochelle, NY, USA.

\* cited by examiner

300 A COMPUTER PROGRAM PRODUCT

302 A SIGNAL BEARING MEDIUM

304 AT LEAST ONE OF ONE OR MORE COMPUTER-READABLE INSTRUCTIONS CONFIGURED TO:

RECEIVE A SIGNAL REPRESENTATIVE OF A MOTION ASSOCIATED WITH AT LEAST A PORTION OF A HUMAN SUBJECT

REPEATEDLY ANALYZE A STEP RESPONSE ASSOCIATED WITH THE SIGNAL REPRESENTATIVE OF THE MOTION TO DETERMINE ONE OR MORE OF A PEAK TIME $T_P$ OF THE STEP RESPONSE, AN ESTIMATED OVERSHOOT MAGNITUDE $M_P$ OF THE STEP RESPONSE, A DAMPING RATIO $\zeta$ OF THE STEP RESPONSE AND/OR ONE OR MORE POLYNOMIAL POLES OF THE STEP RESPONSE CLASSIFY THE MOTION AS EITHER A PRECISE SELECTION OR AS BROAD SELECTION BASED, AT LEAST IN PART, ON ONE OR MORE OF THE PEAK TIME $T_P$, THE ESTIMATED OVERSHOOT MAGNITUDE $M_P$, THE DAMPING RATIO $\zeta$ AND/OR THE ONE OR MORE POLYNOMIAL POLES.

| 306 A COMPUTER-READABLE MEDIUM | 308 A RECORDABLE MEDIUM | 310 A COMMUNICATIONS MEDIUM |

FIG. 6

SELECTIVE MOTOR CONTROL CLASSIFICATION

BACKGROUND

The present disclosure is related to detecting and classifying motion of a human subject and, more particularly, to detecting and classifying motion as broad or precise selections to facilitate interaction with augmented reality systems.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 6 is a block diagram of an example computer program product; and

DETAILED DESCRIPTION

Figure 1:
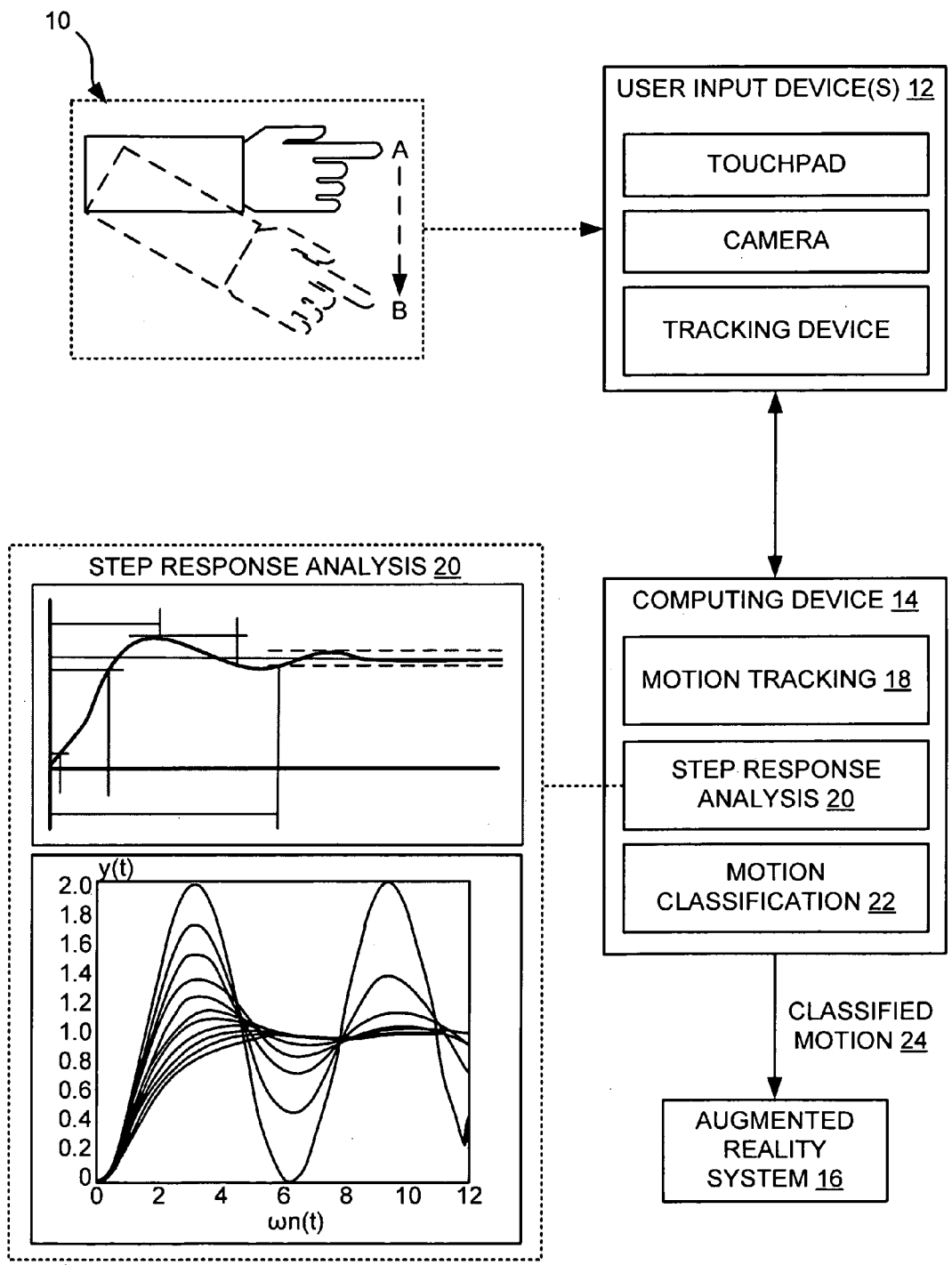
FIG. 1 is a block diagram illustrating an example system for motion detection and classification.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is drawn, inter alia, to methods, systems, devices, and/or apparatus related to detecting and classifying motion of a human subject and, more particularly, to detecting and classifying motion as broad or precise selections to facilitate interaction with augmented reality (AR) systems.

The present disclosure contemplates that a goal of existing AR user interface systems may be to provide users with an extended, fluid interaction with their environment. A natural user interface may be a desirable component of such an AR system. AR user interfaces may benefit from an understanding of what a user intends to select and when the user may care about effectuating a precise selection, as opposed to a broad or gross selection.

The present disclosure further contemplates that humans unconsciously use a phenomena known as selective motor control. Selective motor control relates to internal nervous system feedback that alters the kinematic spring constant of the human body to increase precision at the cost of speed. For example, when painting a broad area of a painting, the muscles may remain loose to allow the body to move in broad strokes. When a painter attempts to paint a fine detail of a painting, the muscles may tighten up to allow only slight movements. Such slight movements may have higher frequency oscillations due to a higher spring constant. Similarly, when a marksman begins to aim a gun at a target, the muscles may remain loose to allow the body to homing in on the center of a target. However, the muscles may tighten up to allow only slight movements as the gun is pointed near the center. Effects of selective motor control may easily be seen in these painter and marksman examples.

Methods, systems, devices, and/or apparatus are presented herein that may utilize detection of a change in a user's body part oscillation amplitude and/or frequency to determine when the user may be close to a selection or area that may be important to the user.

FIG. 1 is a block diagram illustrating an example system for motion detection and classification in accordance with at least some embodiments of the present disclosure. In a basic configuration, an example system may be configured to detect a movement 10 of a human body part (e.g., a hand, finger and/or eye) from a first point (e.g., point A) to a second point (e.g., point B). This movement 10 may be received and/or detected by user input devices 12 and the movement 10 may be classified by a computing device 14. The classified movement 24 may be transmitted to an augmented reality system 16 to provide a user a natural, fluid interaction with the augmented reality system 16.

One or more user input devices 12 may be arranged to receive and/or track the movement 10 associated with a user (e.g., a movement of a human body part associated with the user). User input device 12 may include a touchpad, a mouse, a camera, and/or a tracking device, among others. User input device(s) 12 may be arranged in communication with one or more computing device(s) 14. An example computing device 14 may include a motion tracking component 18, a step response analysis component 20 and/or a motion classification component 22. The motion tracking component 18 may be arranged to communicate with the user input device(s) 12 and effective to track the movement 10 associated with the user. The motion tracking component 18 may be adapted to convert the tracked movement 10 to an electrical signal representative of the tracked movement 10. Based at least in part on the tracked movement 10 (or the representative signal thereof), the step response analysis component 20 may be arranged to characterize a step response of the tracked movement.

This step response may be analyzed by the step response analysis component 20 and/or the motion classification component 22 to identify or otherwise determine one or more values that may be helpful in classifying the movement 10. Such values may be associated with the step response and may include a peak time $t_p$, an overshoot magnitude $M_p$, a damping ratio $\zeta$ and/or polynomial poles/zeros, among others. The step response analysis component 20 may be arranged to analyze a 2nd order step response, for example, which may be representative of a movement 10 from point A to point B. Because a movement's final destination may be unknown, the computing device 14 may be arranged to determine the peak time $t_p$. Overshoot magnitude $M_p$ may be estimated after oscillations have started. These values may convey information about the movement's 10 final destination and the precision with which movement 10 is intended to make a selection. For example, if $M_p$ is a relatively small value, the user may be making a more detailed selection and the augmented reality system 16 may dynamically refine a selection grid or highlight a small feature that is in the central area of the oscillations. This may assist a user to make the selection they intended.

Further, the step response analysis component 20 also depicts multiple step response functions that may represent the movement 10 from point A to point B. These step response functions depict step responses having different damping ratio $\zeta$ (or damping coefficients). Due to selective motor control, movements may be interpreted differently. For example, at $\zeta=1$, a movement may be made with extreme care and a drawn line may be fine or a selection may be highly precise. As $\zeta$ tends toward zero, the movement 10 may experience more oscillation. In that case, a user may be not very particular about their selection or may be attempting to select or affect a broad area.

Based on one or more of the values associated with the step response, the motion classification component 22 may be adapted to determine an appropriate classification of the movement 10 and transmit the classified motion 24 to an augmented reality system 16.

Figure 2:
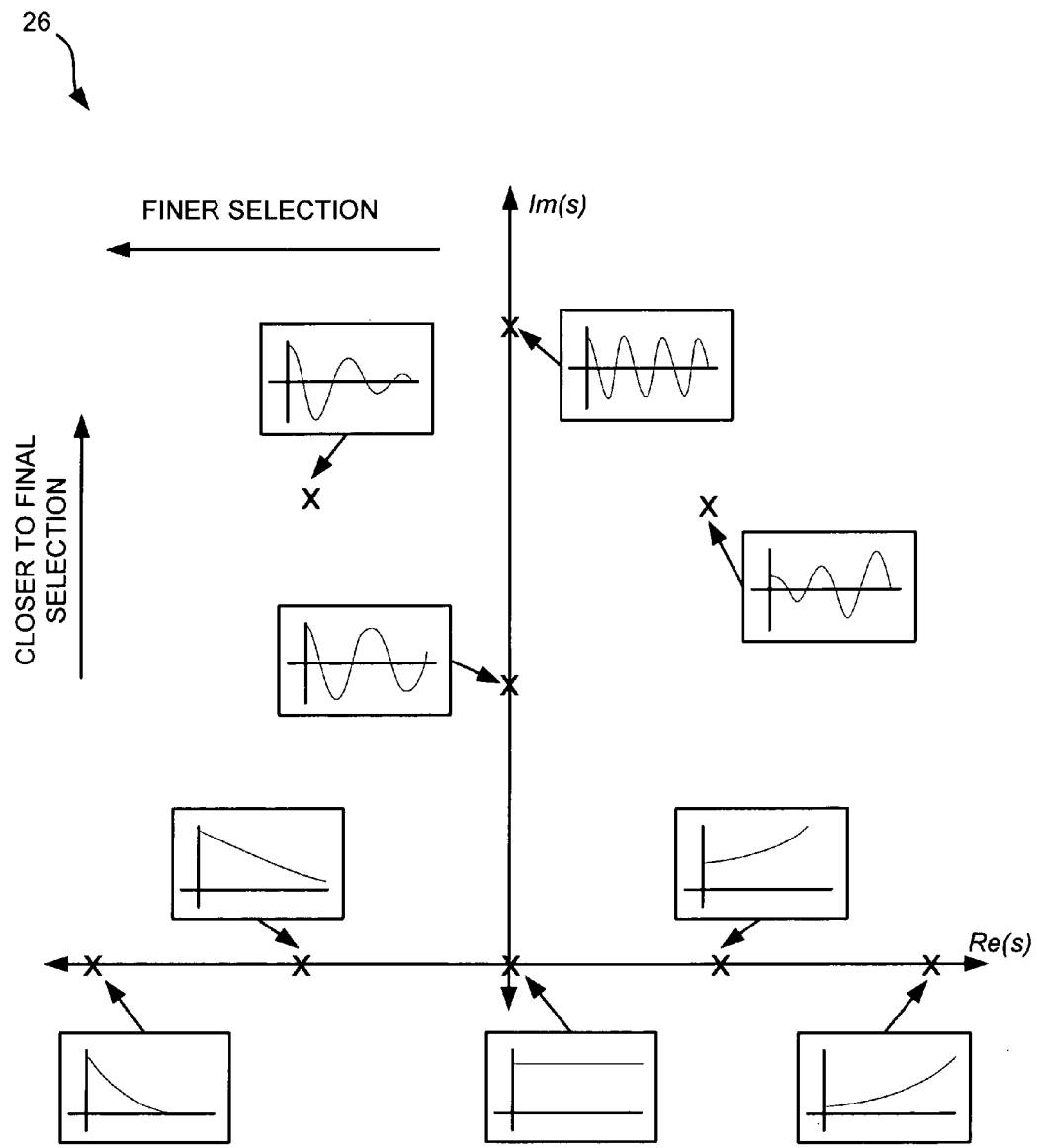
FIG. 2 is a graph depicting an example s-plane representation of several polynomial poles that may be useful for motion detection and classification.

FIG. 2 is a graph depicting an example s-plane representation 26 of several polynomial poles that may be useful for motion detection and classification in accordance with at least some embodiments of the present disclosure. In some examples, a more complete classification may be achieved by fitting the step response to polynomial poles/zeros (poles represented by an "X" in FIG. 2) in s-space. Polynomial poles/zeros may be equivalent to terms on the bottom of the step response polynomial having the form $s_n$-x.

In some examples, a step response of a second order system may be analyzed. An example transfer function of the second order system may be represented by the equation $$H(s) = \frac{\omega_n^2}{s^2 + 2\zeta\omega_n s + \omega_n^2} = \frac{\omega_n^2}{(s + \zeta\omega_n + j\omega_d)(s + \zeta\omega_n - j\omega_d)},$$

where $\omega_n$ represents an undamped natural frequency, $\omega_d = \omega_n\sqrt{1-\zeta^2}$ represents a damped frequency and $\zeta$ represents a damping ratio. In some examples, poles may be located at an angle $\theta$, where $\theta = \sin^{-1}\zeta$ from the imaginary axis in the s-plane. Further, poles may be located along the real axis at a distance of $\omega_n\zeta$ from zero and along the imaginary axis at a distance of $\omega_d$ from zero. In some example second order systems, overshoot magnitude may be estimated using the equation $$M_p \approx 1 - \frac{\zeta}{0.6}$$

for damping ratios in the range $0 \leq \zeta \leq 0.6$.

In some examples, a step response of a movement may have two to four poles and possibly one or more topside zeros. Such polynomial poles may be derived from and characterize the frequency, damping and/or magnitude. As the poles move to the left of the s-plane graph 26 (i.e., having a lesser real component), the user may be damping their motions more through selective motor control and may be trying to make a finer selection. As the frequency increases and the poles move toward the top of the s-plane graph 26 (i.e., having a greater imaginary component), the user may be getting closer to their final selection point. In this manner, movements may be easier to classify.

Figure 3:
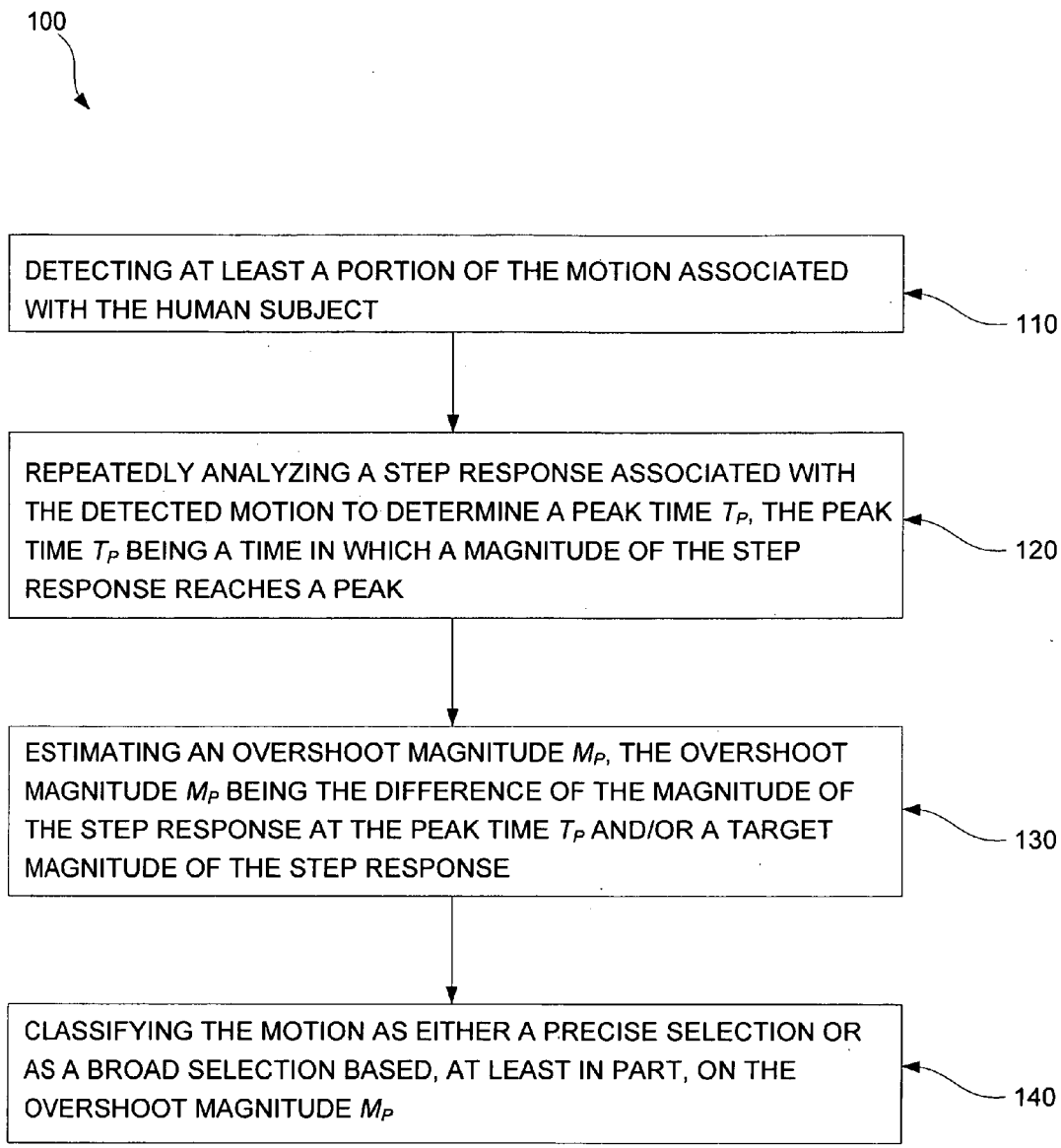
FIG. 3 is a flowchart depicting some example methods for detecting and classifying motion.

FIG. 3 is a flowchart depicting some example methods 100 of detecting and classifying motion, in accordance with at least some embodiments of the present disclosure. Example method 100 may include one or more of operations, functions or actions as illustrated by blocks 110, 120, 130 and/or 140.

Processing may begin at block 110, which may include detecting a motion of a human subject (or a portion thereof). The motion may be detected by a user input device such as a touchpad, a mouse, a camera and/or a tracking device, for example. Block 110 may be followed by block 120.

Block 120 may include repeatedly analyzing a step response associated with the motion. The analysis operations may be performed by a computing device that may include a step response analysis component, for example. In general, a step response may represent a time behavior of the outputs of a general system when its inputs (e.g., movement and/or motion from one position to another) change from zero to a target value in a very short time, where such a change may represent the motion from one location to another. A step response may represent a physical reaction to a user's command to his own body to move from an initial location to a target location. While the user's desired motion is a "step" with an initial position and a final position and the user's desired motion may be a direct transition from one to the other, the physical response of the user's body and thus the input device may be constrained by physical mass and compliance so that the response may not be a perfect step. Thus the step response may be the motion path followed as the user may indicate a change from point A to point B. The step response may include a rise time (the time to get 90% of the way to the final position), and overshoot (how far the movement goes past the intended final position), and oscillations as the user attempts to correct for overshoot. In some examples where the user intends to be very careful, there may be no oscillations, but the time to reach the rise time may be relatively slow and the shape of the acceleration and deceleration may be matched to a canonical step response to extract characteristic terms. This may assist in determining a peak time $t_p$. The peak time $t_p$ may be a time in which a magnitude of the step response reaches a peak. Block 120 may be followed by block 130.

At block 130, an overshoot magnitude $M_p$ may be estimated. The estimation operations may be performed by a computing device that may include a step response analysis component, for example. Such computing device may be the same computing device or a different computing device discussed in relation to Block 120. The overshoot magnitude $M_p$ may be the difference of the magnitude of the step response at the peak time $t_p$ and a predetermined magnitude of the step response. Block 130 may be followed by block 140.

Block 140 may include classifying the motion as a precise selection or as a broad selection based, at least in part, on the overshoot magnitude $M_p$. The classification operations may be performed by a computing device that may include a motion classification component, for example. Such computing device may be the same computing device or a different computing device discussed in relation to blocks 120 and/or 130. In some embodiments, method 100 may also include repeating the classifying (block 140) operation if the motion is classified as a broad selection.

In some embodiments, method 100 may further include analyzing the step response associated with the motion to determine a damping ratio ζ of the step response. Generally, a damping ratio may determine how much a system oscillates as the step response decays toward a steady state. In some embodiments, the motion may be classified as a precise selection or as a broad selection based, at least in part, on the damping ratio ζ. Some embodiments may include repeating the classifying operation if the motion is classified as a broad selection.

In some embodiments, method 100 may further include analyzing the step response associated with the motion to determine two or more polynomial poles based, at least in part, on the magnitude of the step response, a frequency of the step response and the damping ratio ζ. In some examples, poles may be determined by comparing the detected motion to several candidate responses (such as first order, second order and/or third order response(s)) and determining which response order is a desirable fit. Once the order is determined (in some cases the order may always be assumed to be the same) parameters may be determined by least squares fitting and terms such as ζ and $w_n$ may be extracted from simplified relations, as discussed below. In some embodiments, the motion may be classified as a precise selection or as a broad selection based, at least in part, on the two or more polynomial poles. In some examples, classification may be performed by separating the real and imaginary magnitudes of the poles, for example, and using the real component of those poles as a selection fineness metric. In some examples, a selection may be finer the more negative the real component of the poles is. Some embodiments may include repeating the classifying operation if the motion is classified as a broad selection.

Some examples provide that a polynomial pole having a greater magnitude negative real component may be indicative of a greater chance of being classified as a precise selection. Similarly, some examples provide that a polynomial pole having a greater magnitude positive real component may be indicative of a greater chance of being classified as a broad selection. In some examples, a real component greater than zero may be classified as a very broad or general selection (e.g., when a user is attempting to color and/or or select a large area). As the real component becomes more negative, the selection may be indicative of a finer selection.

In some embodiments, the step response having a higher frequency may be indicative of a greater chance of being classified as a precise selection. Similarly, the step response having a lower frequency may be indicative of a greater chance of being classified as a broad selection. This can be seen above by the relationship between the damping ratio and the frequency in the s-space analysis. In some examples, a person making a finer selection may tighten their muscles, increasing the resonant frequency of their movements due to reduced compliance.

Some embodiments relate to detecting motion of a human body part. While any human motion may be detected and classified, some examples may include human hands, fingers and/or eyes, among others. The motion may include gestures, actions, interactions and the like. Some examples may detect motion in many ways, including reading the motion on a touch screen display, tracking the motion using a mouse, tracking the motion using a camera and/or tracking the motion using an eye tracking device. Many other motion detectors may also be implemented.

In some examples, the motion comprises an interaction with an AR system that may have multiple objects of different types. In some examples, an AR computer aided design system may display virtual solid objects which may have surfaces, edges, and/or vertices. Each selectable type may correspond to a different level of refinement. Upon classifying a motion as a broad selection, some embodiments may select a broader component such as a surface and/or multiple components in an indicated area. Upon classifying a motion as a precise selection, some embodiments may select a finer component such as an edge or a vertex. In this manner, a user's selection motion may be used to determine the user's meaning and provide a more natural AR experience.

Figure 4:
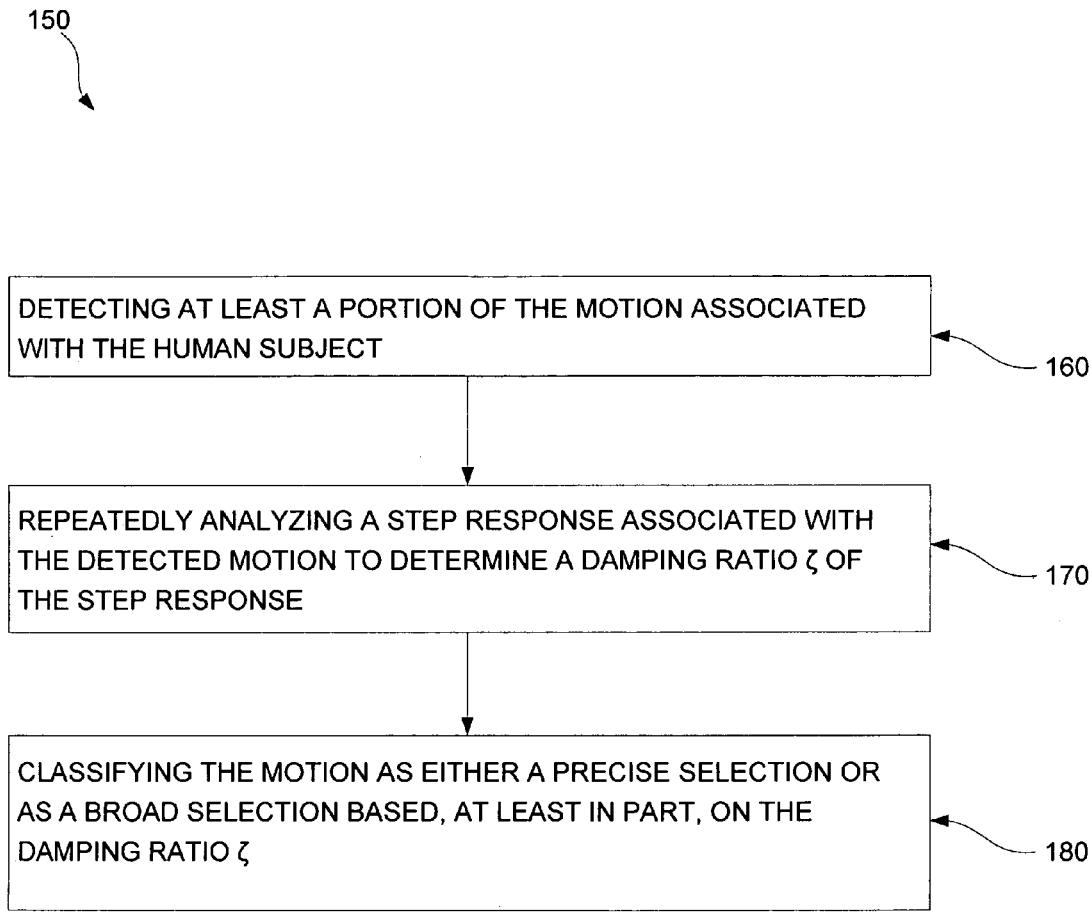
FIG. 4 is a flowchart depicting additional example methods for detecting and classifying motion.

FIG. 4 is a flowchart depicting some example methods 150 of detecting and classifying motion, in accordance with at least some embodiments of the present disclosure. Example method 150 may include one or more of operations, functions or actions as illustrated by blocks 160, 170 and/or 180.

Processing may begin at block 160, which may include detecting a motion of a human subject (or a portion thereof). The motion may be detected by a user input device such as a touchpad, a mouse, a camera and/or a tracking device, for example. Block 160 may be followed by block 170.

Block 170 may include repeatedly analyzing a step response associated with the motion. The analysis operations may determine a damping ratio of the step response. The analysis operations may be performed by a computing device that may include a step response analysis component, for example. Block 170 may be followed by block 180.

Block 180 may include classifying the motion as a precise selection or as a broad selection based, at least in part, on the damping ratio ζ. In some examples, the negative real component of the step response function may be used as a metric of selection fineness. Further, in some second order response examples, the selection fineness metric may be the damping ratio times the natural frequency detected, or $w_n \zeta$. In some examples, it may be useful to detect the damping ratio alone (e.g., via the overshoot relationship above), as the selection fineness metric may simply be the damping ratio. When the selection fineness metric trends high (e.g., approaching ζ=1 if ζ is used), the user may be attempting to make a very precise selection and/or drawing. When the selection fineness metric trends low (e.g., approaching ζ=0.5 or lower if ζ is used) the user may be attempting a broad selection. In some examples, if a user is selecting objects and ζ=0.2, the user may be broadly indicating an area and the classification may indicate that many or large selectable objects in the gesture area are to be selected. In some examples, if a user is selecting objects and ζ=0.95, the user may be attempting to be very specific and the classification may indicate that large or general selectable objects should be ignored in favor of selecting finer or occluded selectable objects. The classification operations may be performed by a computing device that may include a motion classification component, for example. Such computing device may be the same computing device or a different computing device discussed in relation to block 170.

Figure 5:
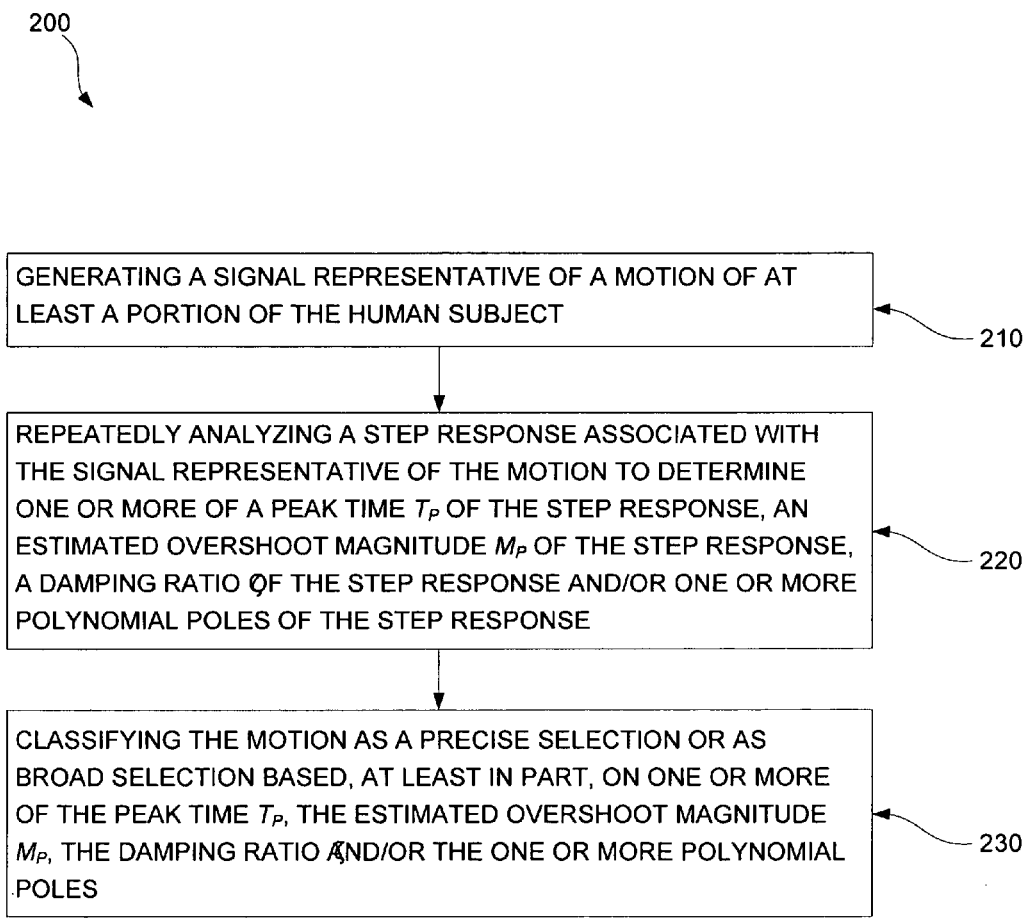
FIG. 5 is a flowchart depicting some additional example methods for detecting and classifying motion.

FIG. 5 is a flowchart depicting some example methods 200 of detecting and classifying motion, in accordance with at least some embodiments of the present disclosure. Example method 200 may include one or more of operations, functions or actions as illustrated by blocks 210, 220 and/or 230.

Processing may begin at block 210, which may include generating a signal representative of a motion of a human subject (or a portion thereof). In some example implementation the signal repetitive of the motion may be generated by a user input device 12 as is illustrated and described with respect to FIG. 1. Block 210 may be followed by block 220.

At block 220 may include repeatedly analyzing a step response associated with the signal to determine a peak time $t_p$ of the step response, an estimated overshoot magnitude $M_p$ of the step response, a damping ratio $\zeta$ of the step response and/or one or more polynomial poles of the step response. In some example implementations (e.g., see FIG. 1), a computing device 14 may be adapted to receive the signal generated at block 220, and analyze the received signal to identify the various characteristics of the step response as described herein. Block 220 may be followed by block 230.

Block 230 may include classifying the motion as a precise selection or as broad selection based on the peak time $t_p$, the estimated overshoot magnitude $M_p$, the damping ratio $\zeta$ and/or the one or more polynomial poles. In some embodiments, method 200 may also include repeating the analyzing (block 220) and classifying (block 230) operations until the motion is classified as a precise selection. In some example implementations (e.g., see FIG. 1), computing device 14 may be further adapted to classify the identified characteristics of the step response from block 230 into a specific type of motion.

FIG. 6 illustrates a block diagram of an example computer program product 300 arranged in accordance with at least some embodiments described herein. In some examples, as shown in FIG. 6, computer program product 300 may include a signal bearing medium 302 that may also include machine readable instructions 304. Instructions 304 may be adapted to receive a signal representative of a motion of at least a portion of a human subject. The instructions 304 may also be adapted to repeatedly analyze a step response associated with the signal to determine a peak time $t_p$, an estimated overshoot magnitude $M_p$, a damping ratio $\zeta$ and/or one or more polynomial poles of the step response. Further, instructions 304 may be adapted to classify the motion as a precise selection or as broad selection based, at least in part, on the peak $t_p$, the estimated overshoot magnitude $M_p$, the damping ratio $\zeta$ and/or the two or more polynomial poles. In some examples, the signal representative of a motion a human subject may be generated by a hand position sensor, a finger position sensor, a foveated gaze detector and/or eye tracker.

Also depicted in FIG. 6, in some examples, computer product 300 may include one or more of a computer readable medium 306, a recordable medium 308 and a communications medium 310. The dotted boxes around these elements depict different types of mediums included within, but not limited to, signal bearing medium 302. These types of mediums may distribute instructions 304 to be executed by logic. Computer readable medium 306 and recordable medium 308 may include, but are not limited to, a flexible disk, a hard disk drive (HDD), a Compact Disc (CD), a Digital Video Disk (DVD), a digital tape, a computer memory, etc. Communications medium 310 may include, but is not limited to, a digital and/or an analog communication medium (e.g., a fiber optic cable, a waveguide, a wired communication link, a wireless communication link, etc.).

Figure 7:
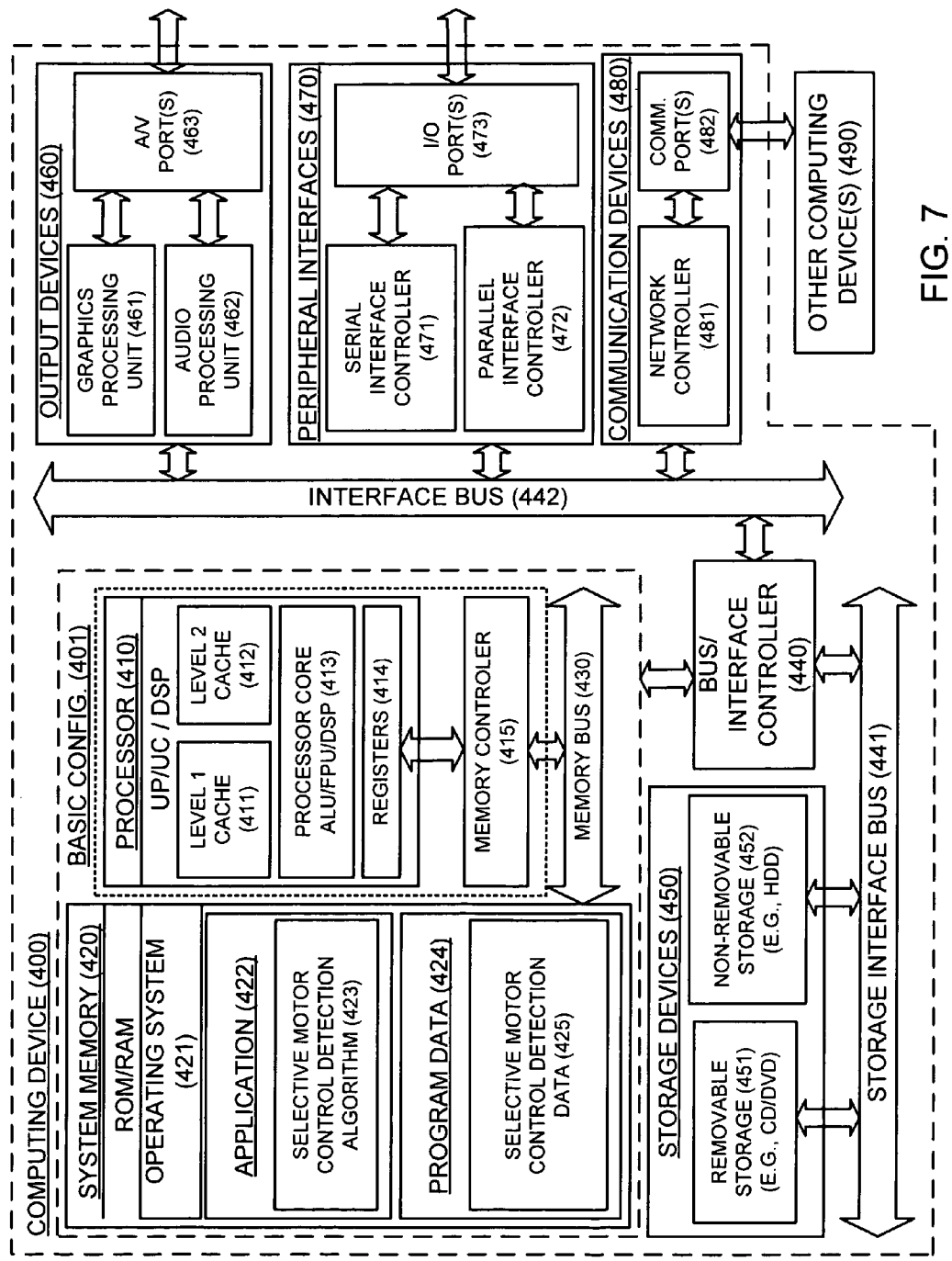
FIG. 7 is a block diagram illustrating an example computing device that may be arranged for motion detection and classification implementations, all arranged in accordance with at least some embodiments of the present disclosure.
Figure 5:
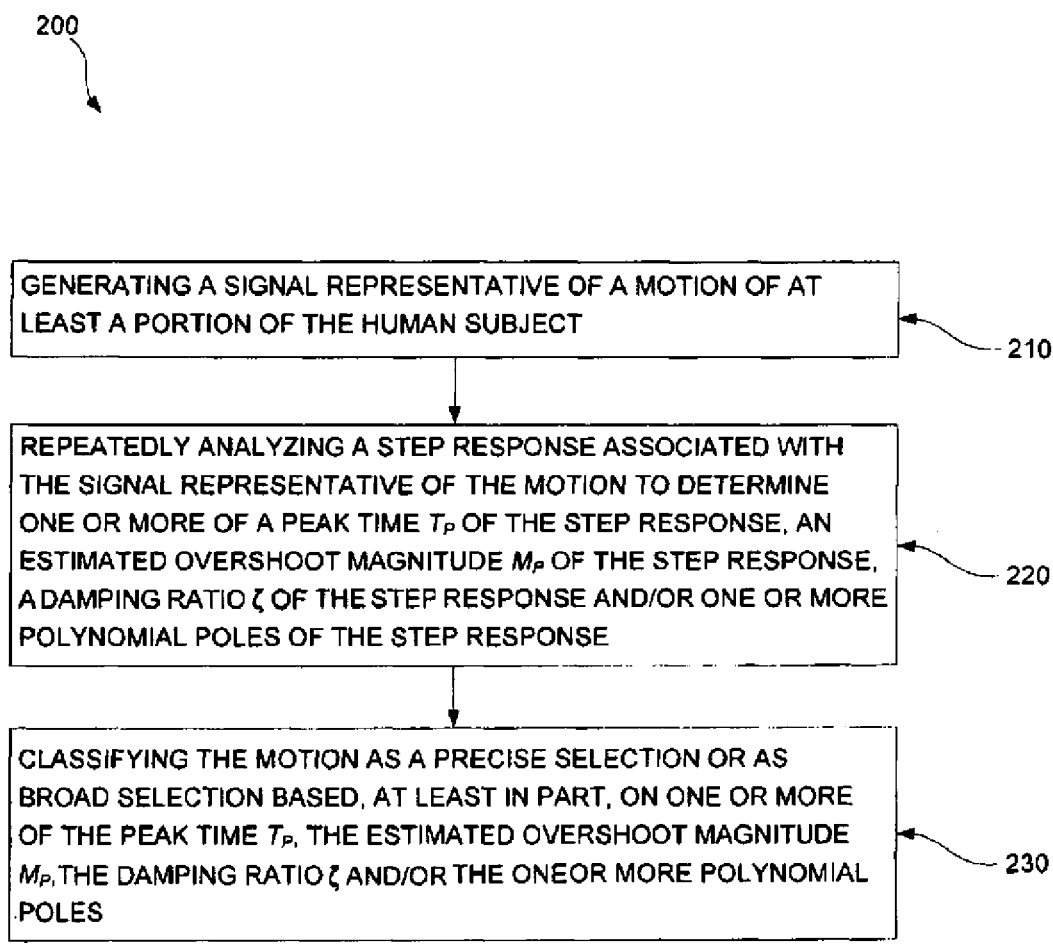

FIG. 7 is a block diagram illustrating an example computing device that may be arranged for motion detection and classification implementations in accordance with at least some embodiments of the present disclosure. In a very basic configuration 401, computing device 400 typically may include one or more processors 410 and system memory 420. A memory bus 430 can be used for communicating between the processor 410 and the system memory 420.

Depending on the desired configuration, processor 410 can be of any type including but not limited to a microprocessor ($\mu$P), a microcontroller ($\mu$C), a digital signal processor (DSP), or any combination thereof. Processor 410 can include one more levels of caching, such as a level one cache 411 and a level two cache 412, a processor core 413, and registers 414. The processor core 413 can include an arithmetic logic unit (ALU), a floating point unit (FPU), a digital signal processing core (DSP Core), or any combination thereof. A memory controller 415 can also be used with the processor 410, or in some implementations the memory controller 415 can be an internal part of the processor 410.

Depending on the desired configuration, the system memory 420 can be of any type including but not limited to volatile memory (such as RAM), non-volatile memory (such as ROM, flash memory, etc.) or any combination thereof. System memory 420 typically includes an operating system 421, one or more applications 422, and program data 424. Application 422 may include a selective motor control detection algorithm 423 that may be arranged to identify and/or detect selective motor control associated with motion of a human subject. Program Data 424 may include selective motor control data 425 that may be useful in to identify and/or detect selective motor control associated with motion of a human subject. In some embodiments, application 422 can be arranged to operate with program data 424 on an operating system 421 such that human motion may be detected, analyzed and/or classified as broad or precise selections in accordance with the techniques described herein.

Computing device 400 can have additional features or functionality, and additional interfaces to facilitate communications between the basic configuration 401 and any required devices and interfaces. For example, a bus/interface controller 440 can be used to facilitate communications between the basic configuration 401 and one or more data storage devices 450 via a storage interface bus 441. The data storage devices 450 can be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 420, removable storage 451 and non-removable storage 452 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of device 400.

Computing device 400 can also include an interface bus 442 for facilitating communication from various interface devices (e.g., output interfaces, peripheral interfaces, and communication interfaces) to the basic configuration 401 via the bus/interface controller 440. Example output devices 460 include a graphics processing unit 461 and an audio processing unit 462, which can be configured to communicate to various external devices such as a display or speakers via one or more A/V ports 463. Example peripheral interfaces 470 include a serial interface controller 471 or a parallel interface controller 472, which can be configured to communicate with external devices such as input devices (e.g., keyboard, mouse, pen, voice input device, touch input device, etc.) or other peripheral devices (e.g., printer, scanner, etc.) via one or more I/O ports 473. An example communication device 480 includes a network controller 481, which can be arranged to facilitate communications with one or more other computing devices 490 over a network communication via one or more communication ports 482. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 400 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 can also be implemented as a personal computer including both laptop computer and non-laptop computer configurations.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of identifying selective motor control associated with motion of a human subject, the method comprising:
    detecting, by a computing device, at least a portion of the motion associated with the human subject;
    analyzing, by a computing device, a step response associated with the detected motion to determine a peak time, the peak time being a time in which a magnitude of the step response reaches a peak;
    estimating, by the computing device, an overshoot magnitude, the overshoot magnitude being the difference of the magnitude of the step response at the peak time and a target magnitude of the step response; and
    classifying, by the computing device, the motion as either a precise selection or as a broad selection based, at least in part, on the overshoot magnitude.

2. The method of claim 1, the method further comprising repeating classifying the motion if the motion is classified as a broad selection.

3. The method of claim 1, wherein analyzing the step response further comprises determining a damping ratio of the step response; and wherein classifying the motion is further based, at least in part, on the damping ratio.

4. The method of claim 3, the method further comprising repeating classifying the motion if the motion is classified as a broad selection.

5. The method of claim 1, wherein analyzing the step response further comprises determining two or more polynomial poles based, at least in part, on one or more of the magnitude of the step response, a frequency of the step response and the damping ratio, and wherein classifying the motion is further based, at least in part, on the two or more polynomial poles.

6. The method of claim 5, the method further comprising repeating classifying the motion if the motion is classified as a broad selection.

7. The method of claim 5, wherein the classification is weighted towards a precise selection when a polynomial pole is determined to have a negative real component.

8. The method of claim 5, wherein the classification is weighted towards a broad selection when a polynomial pole is determined to have at least one of a positive real component and a zero real component.

9. The method of claim 5, wherein the classification is weighted towards a precise selection when the step response is determined to have a frequency greater than 3 Hz.

10. The method of claim 5, wherein the classification is weighted towards a broad selection when the step response is determined to have a frequency less than 3 Hz.

11. The method of claim 1, wherein the motion associated with the human subject comprises one or more of a motion associated with a human hand, a motion associated with a human finger and/or a motion associated with a human eye.

12. The method of claim 1, wherein the motion associated with the human subject comprises one or more of a motion associated with a gesture and/or a motion associated with an interaction.

13. The method of claim 1, wherein detecting a motion of at least a portion of the human subject comprises one or more of:
  reading the motion on a touch screen display;
  tracking the motion using a mouse;
  tracking the motion using a camera; and/or
  tracking the motion using an eye tracking device.

14. The method of claim 1, wherein the motion comprises an interaction with an augmented reality system comprising a plurality of objects within a plurality of selectable object types, each selectable object type corresponding to a different level of refinement.

15. The method of claim 14, further comprising upon classifying the motion as a broad selection, refining one of the plurality of selectable object types to a selectable object type having a more detailed level of refinement.

16. The method of claim 14, further comprising upon classifying the motion as a precise selection, selecting the selectable object type.

17. A computer program product, comprising:
  a non-transitory signal-bearing medium comprising computer-readable instructions stored thereon, which, when executed by one or more processing units, operatively enable a computing platform to:
    receive a signal representative of a motion associated with at least a portion of a human subject;
    analyze a step response associated with the signal representative of the motion to determine one or more of a peak time of the step response, an estimated overshoot magnitude of the step response, a damping ratio of the step response and one or more polynomial poles of the step response; and
    classify the motion as either a precise selection or as broad selection based, at least in part, on one or more of the peak time, the estimated overshoot magnitude, the damping ratio and/or the two or more polynomial poles.

18. The computer program product of claim 17, wherein the signal representative of a motion associated with at least a portion of a human subject is generated by one or more of a hand position sensor, a finger position sensor, a foveated gaze detector and/or eye tracker.

19. A computing device adapted to detect selective motor control, comprising:
  a motion tracking component configured to generate a signal representative of at least a portion of a motion associated with a human subject;
  a step response analysis component configured to analyze a step response associated with the signal to determine one or more of a peak time of the step response, an estimated overshoot magnitude of the step response, a damping ratio of the step response and one or more polynomial poles of the step response; and
  a motion classification component configured to classify the motion as either a precise selection or a broad selection based, at least in part, on one or more of the peak time, the estimated overshoot magnitude, the damping ratio and/or the two or more polynomial poles.

20. The computing device of claim 19, wherein the motion classification component is further configured to repeat the classifying operation until the motion is classified as a precise selection.

21. A method of identifying selective motor control associated with motion of a human subject, the method comprising:
  detecting at least a portion of the motion associated with the human subject;
  analyzing a step response associated with the detected motion to determine a damping ratio of the step response; and
  classifying the motion as either a precise selection or as a broad selection based, at least in part, on the damping ratio.

22. The method of claim 1, wherein analyzing the step response further comprises determining two or more polynomial poles based, at least in part, on one or more of a magnitude of the step response, a frequency of the step response and the damping ratio, and wherein classifying the motion is further based, at least in part, on the two or more polynomial poles.

* * * * *

UNITED STATES PATENT AND TRADEMARK OFFICE
CERTIFICATE OF CORRECTION

PATENT NO. : 8,614,663 B2  
APPLICATION NO. : 12/724023  
DATED : December 24, 2013  
INVENTOR(S) : Kruglick Page 1 of 2

It is certified that error appears in the above-identified patent and that said Letters Patent is hereby corrected as shown below:

In the Drawings

In Fig. 5, Sheet 5 of 7, for Tag "220", in Line 5, delete " ØF " and insert -- ζ OF --, therefor. (See Attached Sheet)

In Fig. 5, Sheet 5 of 7, for Tag "230", in Line 4, delete " ÅND/OR " and insert -- ζ AND/OR --, therefor.

In Fig. 7, Sheet 7 of 7, in Box "(415)", Line 1, delete "MEMORY CONTROLER" and insert -- MEMORY CONTROLLER --, therefor.

In the Specification

In Column 6, Line 23, delete "ratio of" and insert -- ratio ζ of --, therefor.

Signed and Sealed this  
Twentieth Day of May, 2014

Michelle K. Lee  
*Deputy Director of the United States Patent and Trademark Office*